United States Patent
Burke et al.

(10) Patent No.: US 6,189,561 B1
(45) Date of Patent: Feb. 20, 2001

(54) VALVE CARTRIDGE FOR LIFT VALVE HAVING THE CLOSING PRESSURE ON THE SEALING LIMITED

(75) Inventors: Peter Ashley Burke, Osborne Park; Alan Leeming, Joondanna; Charles Fridlender, Noranda, all of (AU)

(73) Assignee: Wavtech Pty. Ltd., Osborne Park (AU)

(*) Notice: Under 35 U.S.C. 154(b), the term of this patent shall be extended for 0 days.

(21) Appl. No.: 09/341,398
(22) PCT Filed: Jan. 7, 1998
(86) PCT No.: PCT/AU98/00006
§ 371 Date: Nov. 8, 1999
§ 102(e) Date: Nov. 8, 1999
(87) PCT Pub. No.: WO98/30820
PCT Pub. Date: Jul. 16, 1998

(30) Foreign Application Priority Data

Jan. 7, 1997 (AU) ................................................. PO 4497

(51) Int. Cl.[7] ................................................. F16K 25/00
(52) U.S. Cl. ................................................. 137/454.5; 137/614.2; 251/129.15; 251/264; 251/284
(58) Field of Search ................................................. 137/454.5, 614.2; 251/264, 284

(56) References Cited

U.S. PATENT DOCUMENTS

| | | | |
|---|---|---|---|
| 4,468,001 | 8/1984 | Stanic | 251/86 |
| 4,611,629 | * 9/1986 | Seiffert | 137/454.5 X |
| 4,738,277 | * 4/1988 | Thomas | 137/454.5 |
| 4,778,149 | * 10/1988 | Pesovic et al. | 137/454.5 X |
| 5,060,909 | * 10/1991 | Stanic | 137/454.5 X |
| 5,375,623 | * 12/1994 | Weber | 137/454.5 |
| 5,423,347 | * 6/1995 | Weber | 137/454.5 |
| 5,690,313 | * 11/1997 | Pesovic et al. | 137/454.5 X |

FOREIGN PATENT DOCUMENTS

| | | |
|---|---|---|
| 8024687 | 8/1986 | (AU) . |
| 6573786 | 2/1988 | (AU) . |
| 3104389 | 3/1988 | (AU) . |
| 0387179 | 3/1990 | (EP) . |
| 0708285 | 6/1995 | (EP) . |

* cited by examiner

*Primary Examiner*—Kevin Shaver
*Assistant Examiner*—John Bastianelli
(74) *Attorney, Agent, or Firm*—Price, Heneveld, Cooper, DeWitt & Litton

(57) ABSTRACT

Valve cartridge (10) includes a housing (32) having inlet member (54), outlet member (52) and screw thread (34). Cavity (36) extends axially through housing (32) within which is a piston (38) which moves axially against piston seal (44) to open and close tap (10). A flow chamber (40) is provided at the end of housing (32) and includes a first seal (42) for sealing against a valve seat (18) in the tap (10). Piston (38) can be moved axially by either a rotatable spindle (46) or, a solenoid (48) and push rod (50). Piston (38) is moved axially without any rotation. Coupling member (84) couples spindle (46) to piston (38) and rotates relative to the piston (38) and the spindle. When spindle (46) is turned a predetermined number of revolutions the coupling (84) causes piston (38) to abut piston seal (44), any further rotation of spindle (46) causes rotation of the coupling member (84) without effecting the axial position of piston (38). Ratchet members (92, 94), slip past housing splines (102) when the predetermined number of revolution or force is reached. This limits the sealing pressure of the piston (38) against the piston seal (44) irrespective of the number of turns made of spindle (46). Stops (64) limits maximum opening and prevents check valve (70) from being forced into sealing contact with inlet member (54).

15 Claims, 3 Drawing Sheets

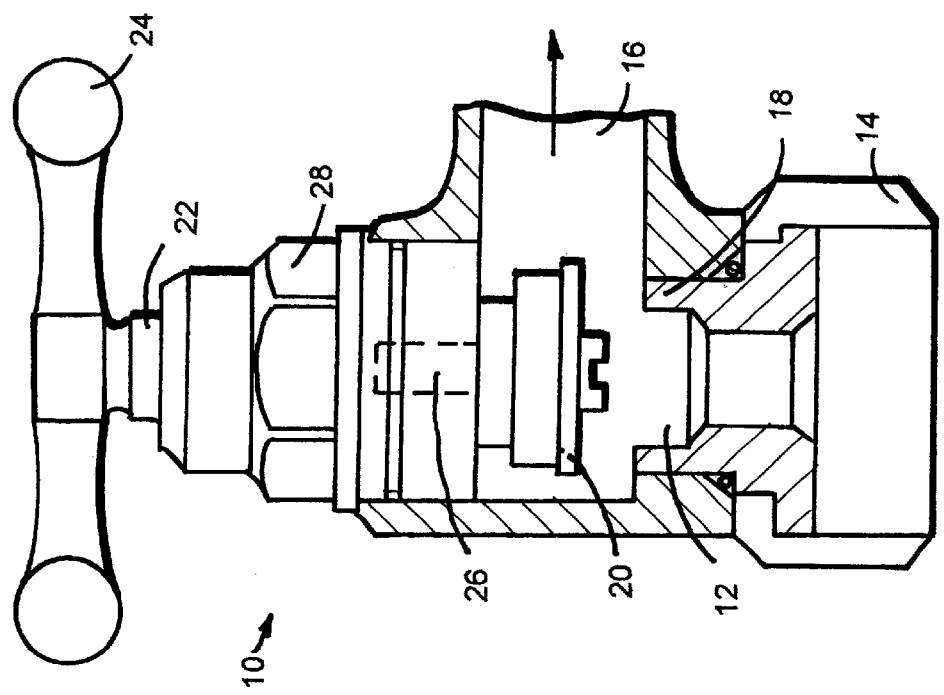
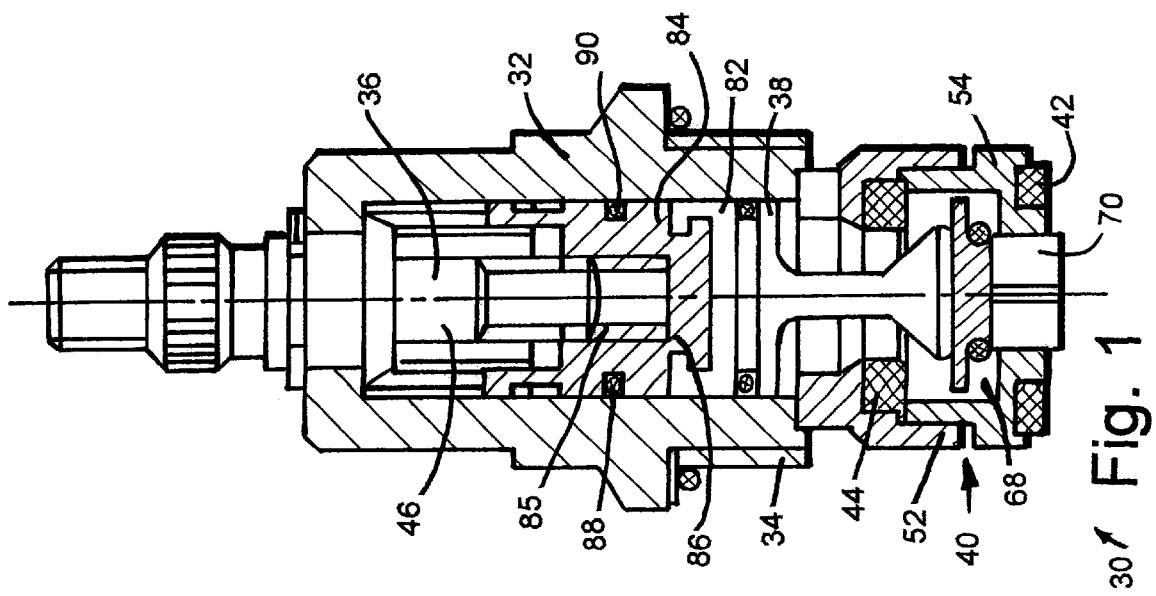

VALVE CARTRIDGE FOR LIFT VALVE HAVING THE CLOSING PRESSURE ON THE SEALING LIMITED

FIELD OF THE INVENTION

The present invention relates to a valve cartridge for fitting into a valve and, in particular, but not exclusively, to a valve cartridge for fitting into a domestic tap.

BACKGROUND OF THE INVENTION

Domestic taps typically have an inlet which is adapted for coupling to a water pipe, a bulbous body in which is disposed a valve seat and valve cartridge, and an outlet in the form of a spout through which water can flow. The valve cartridge is provided with a stem having a handle located outside the body at one end and a washer located within the body at an opposite end for sealing against the valve seat. By turning on the handle, the stem is rotated about its longitudinal axis so as to axially move within the tap body. To close the tap, the handle is turned in a first direction so as to screw down the stem and push the washer against the valve seat. To open the tap, the handle is turned in the opposite direction and the washer is displaced upward by fluid pressure to allow water to flow through the valve seat and out the outlet.

The main cause of leakage in such taps is due to wear of the washer. This wear is usually caused by over-tightening of the handle and stem which leads to tearing, cutting or fracturing of the washer. Washers are normally loosely held within the bottom of the stem so that the two can rotate relative to each other. However, when the stem is over-tightened, the washer can also turn with the stem to accelerate wear against the valve seat.

SUMMARY OF THE INVENTION

It is an object of the present invention to provide a valve cartridge for insertion into a valve, such as a domestic tap, in which the above problems arising from overtightening can be substantially avoided.

According to one aspect of the present invention there is provided a valve cartridge for a valve having a fluid inlet, a fluid outlet, and a valve seat providing fluid communication between said fluid inlet and fluid outlet, said valve cartridge including:

a housing adapted for coupling to said valve, said housing provided with an axially extending first cavity;

a piston movable within said first cavity for controlling flow of fluid through said valve;

a flow chamber provided at one end of said housing and through which said piston can travel, said flow chamber having a first seal for sealing against said valve seat and a piston seal downstream of said first seal against which said piston can seal to prevent flow of fluid through said flow chamber, said flow chamber further including stop means for stopping said piston from moving axially therebeyond the stop means including a plurality of spaced apart lugs formed about the circumference at one end of said flow chamber so as to abut said one end of said housing, said lugs extending radially into said first cavity so as to stop said piston from moving therebeyond, the spaces between adjacent lugs forming openings through which fluid can flow when in transit from said inlet to said outlet, said piston and flow chamber juxtaposed relative to said valve so that the pressure of the fluid acts in a direction tending to force said piston against said piston seal; and, an actuator for moving said piston axially without rotation between a closed position in which said piston abuts said piston seal with a predetermined pressure to prevent flow of fluid through said flow chamber, and a fully open position in which said piston is displaced from said piston seal and abuts said stop means to provide maximum fluid flow through said flow chamber;

whereby, when said housing is coupled to said valve, said first seal abuts said valve seat and said actuator can be operated to move said piston axially through said cavity between said closed position and said fully open position to control the flow of fluid from said inlet to said outlet.

Preferably said flow chamber is formed separately from said housing and is frictionally coupled to said one end of said housing.

Preferably said one end of said housing is formed with a circumferential rebate for receiving said lugs.

Preferably the outer diameter of said circumferential rebate is smaller than the outer diameter of said lugs so that a press-fit is formed between said circumferential rebate and said lugs to hold said flow chamber to said housing.

Preferably said flow chamber comprises a first part which includes said lugs and said piston seal, and a second part which includes said first seal, said first and second parts being press-fit together.

Preferably said first and second parts define a second cavity therebetween in which a non-return valve is housed for preventing flow of fluid through said flow chamber in the direction from said outlet to said inlet.

Preferably said actuator comprises a solenoid which is coupled to said piston.

Preferably the linear position of said solenoid within said housing can be varied to vary the position of the piston when in the fully opened position to progressively vary the flow of fluid through said valve.

In an alternate embodiment, said actuator comprises a spindle rotatably supported by said housing and extending through said first cavity said spindle coupled to said piston in a manner so that rotation for a predetermined number of revolutions of said spindle in a first sense causes relative axial movement between said piston and said spindle in a first direction whereupon the relative axial position of said spindle and piston remains unchanged in response to further rotation of said spindle in said first sense, and rotation for a predetermined number of revolutions of said spindle in an opposite sense causes relative axial movement between said piston and said spindle in an opposite direction whereupon the relative axial position of said spindle and said piston remains unchanged in response to further rotation of said spindle in said opposite sense.

This embodiment also includes, a coupling means for coupling said spindle to said piston with the piston coupled to said coupling means in a manner so as to allow relative rotation between said piston and said coupling means.

Preferably said valve cartridge further comprises detent means or ratchet mechanism acting between said coupling means and said housing to resist rotation of said coupling means during said predetermined number of revolutions of said spindle.

Preferably said detent means or ratchet mechanism includes a plurality of axially extending grooves formed on a circumferential surface of said first cavity and at least one protrusion coupled to said coupling means for receipt in one of said grooves.

Preferably said coupling means is provided with at least one extending finger on each of which one of said projections is formed.

Preferably said finger adapted to flex in the radial direction.

Preferably said coupling means is further provided with a screw thread for threadingly engaging said spindle.

Preferably said coupling means further includes a circumferential groove for engaging a lip which is formed on and extends partially about the circumference of said piston, thereby facilitating said relative rotation between said piston and said coupling means.

Preferably said coupling means is provided with a circumferential seal disposed between said finger and said groove.

According to another aspect of the present invention there is provided a valve cartridge for a valve having a fluid inlet, a fluid outlet, and a valve seat providing fluid communication between said fluid inlet and fluid outlet, said valve cartridge including:
  a housing adapted for coupling to said valve, said housing provided with an axially extending first cavity;
  a piston movable within said first cavity for controlling flow of fluid through said valve;
  a flow chamber provided at one end of said housing and through which said piston can travel, said flow chamber having a first seal for sealing against said valve seat and a piston seal downstream of said first seal against which said piston can seal to prevent flow of fluid through said flow chamber, said flow chamber further including stop means for stopping said piston from moving axially therebeyond the stop means including a plurality of spaced apart lugs formed about the circumference at one end of said flow chamber so as to abut said one end of said housing, said lugs extending radially into said first cavity so as to stop said piston from moving therebeyond, the spaces between adjacent lugs forming openings through which fluid can flow when in transit from said inlet to said outlet, said piston and flow chamber juxtaposed relative to said valve so that the pressure of the fluid acts in a direction tending to force said piston against said piston seal; and,
  a solenoid for moving said piston axially without rotation between a closed position in which said piston abuts said piston seal with a predetermined pressure to prevent flow of fluid through said flow chamber, and a fully open position in which said piston is displaced from said piston seal and abuts said stop means to provide maximum fluid flow through said flow chamber;
  whereby, when said housing is coupled to said valve, said first seal abuts said valve seat and said actuator can be operated to move said piston axially through said cavity between said closed position and said fully open position to control the flow of fluid from said inlet to said outlet.
  a housing adapted for coupling to said valve;
  a spindle rotatably supported by said housing;
  a piston coupled to said spindle in such a manner that rotation of said spindle about its longitudinal axis for a predetermined number of revolutions in a first sense and an opposite sense causes axial motion of the piston in a first direction and an opposite direction respectively between a sealing position and an opened position, and that the axial position of the piston remains unchanged upon further rotation in the same sense of said spindle beyond said predetermined number of revolutions;
  a flow chamber associated with said housing and through which said piston can axially travel, said flow chamber provided with a first seal for sealing against said valve seat and a piston seal disposed downstream of said first seal against which said piston can form a seal when said piston is in said closed position to prevent fluid flow through said flow chamber, said flow chamber disposed so that when said housing is coupled to said valve, said first seal seals against said valve seat and said flow chamber can provide fluid communication between said fluid inlet and said fluid outlet; and,
  a non-return valve disposed in said fluid chamber between said first seal and said piston seal to prevent fluid flow through said chamber in the direction from said outlet to said inlet;
  whereby, in use, rotation of said spindle in said first sense causes said piston to move axially to said closed position in which is piston seals against said piston seal to close said valve with further rotation of said spindle in said first sense uneffecting the axial position of said piston, and rotation of said spindle in said opposite sense causes said piston to move axially away from said piston seal to progressively open said valve and allow fluid to flow from said inlet, through said flow chamber, and out said outlet, and where, the flow of fluid in the direction from said outlet to said inlet is prevented by said non-return valve.

According to another aspect of the present invention there is provided a valve cartridge for a valve having a fluid inlet, a fluid outlet and a valve seat providing fluid communication between said fluid inlet and fluid outlet, said valve cartridge comprising:
  a housing adapted for coupling to said valve;
  a spindle rotatably supported by said housing; coupling means retained within said housing and coupled at one end to said spindle in a manner so that rotation for a predetermined number of revolutions of said spindle in a first sense causes relative axial movement between said coupling means and said spindle in a first direction whereupon the relative axial position of said spindle and coupling means remain unchanged in response to further rotation of said spindle in said first sense, and rotation for a predetermined number of revolutions of said spindle in an opposite sense causes relative axial movement between said coupling means and said spindle in an opposite direction whereupon the relative axial positions of said spindle and coupling means remains unchanged in response to further rotation of said spindle in said opposite sense;
  a piston coupled to an opposite end of said coupling means;
  a flow chamber associated with said housing and through which said piston can axially travel said flow chamber provided with a first seal for sealing against said valve seat and a piston seal disposed downstream of said first seal against which said piston can form a seal to prevent fluid flow through said flow chamber, said flow chamber disposed so that when said

BRIEF DESCRIPTION OF THE DRAWINGS

Embodiments of the present invention will now be described by way of example only with reference to the accompanying drawings in which:

FIG. 1 is a longitudinal section view for a valve cartridge in accordance with a first embodiment of the invention;

DETAILED DESCRIPTION OF THE PREFERRED EMBODIMENTS

Figure 2:
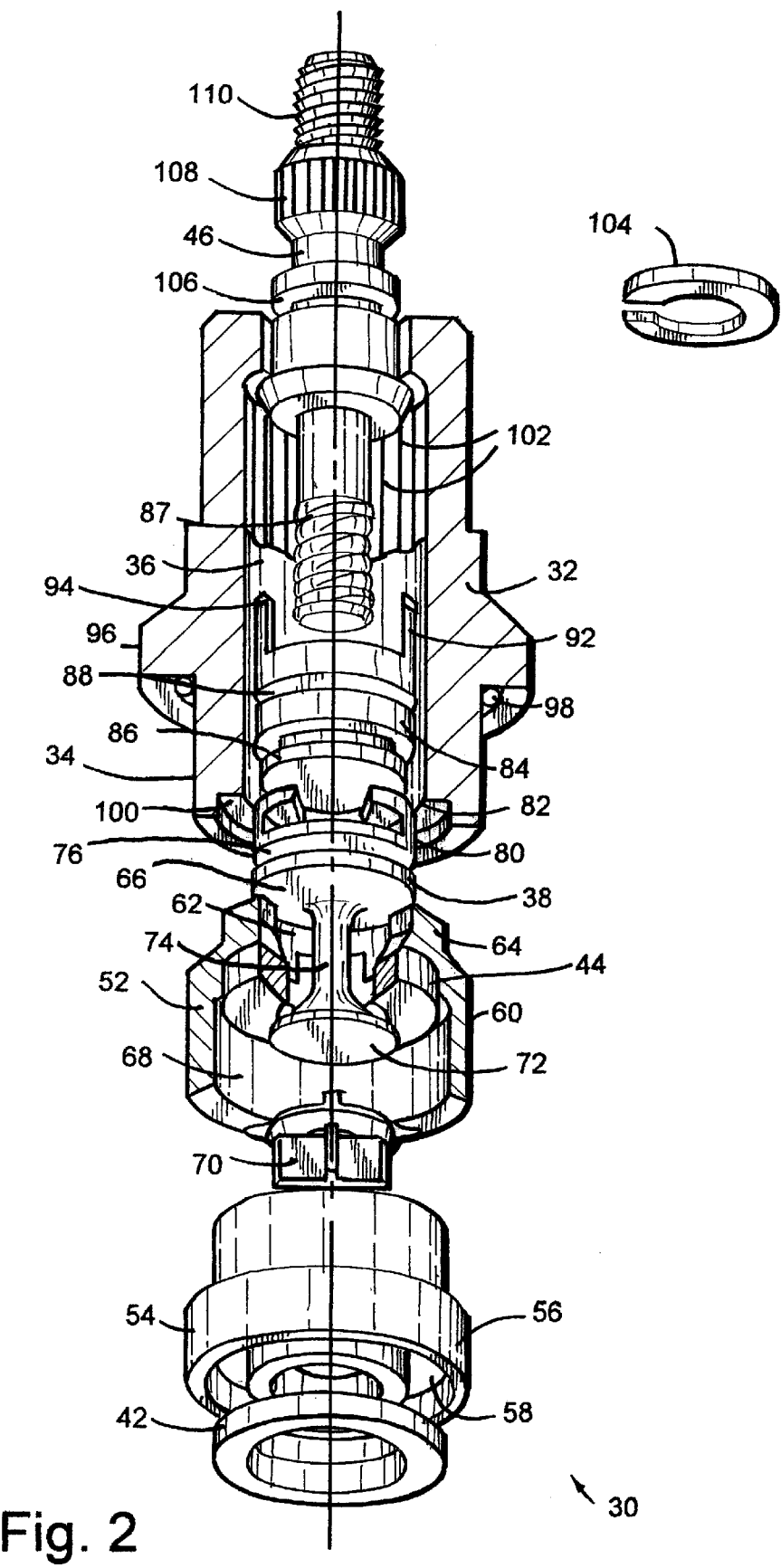
FIG. 2 is an exploded and partial cut away perspective view of the valve cartridge shown in FIG. 1.

A valve 10 in the form of a domestic tap (FIG. 4), comprises a valve body 12 having an inlet 14 at one end and an outlet 16 at an opposite end. A valve seat 18 provides fluid communication between the inlet 14 and outlet 16. Whether or not fluid flows through valve 10 is dependent upon the position of a washer 20 which can be moved into sealing engagement with the seat 18 by rotation of a spindle 22 and associated handle 24. The washer 20 includes a stem 26 which is received within a blind hole formed in the spindle 22. The spindle 22 is mounted within the body 12 in a manner so as to move axially up or down as it is turned anticlockwise or clockwise respectively. Thus, to close the valve 10 the spindle 22 is turned clockwise to push the washer 20 against the valve seat 18. The downward pressure on the washer 20 can be increased by turning harder on the spindle 22. The pressure applied may be sufficient so as to also cause the washer 20 to rotate with the spindle 22. As discussed above, the application of excess pressure can damage the washer 20 to the extent that it no longer forms a seal with the seat 18 so that fluid can leak from the inlet 16 when it is otherwise intended that the valve 10 be closed. The spindle 22 is rotatably held within a crown 28 which is screwed to the body 12.

Figure 3:
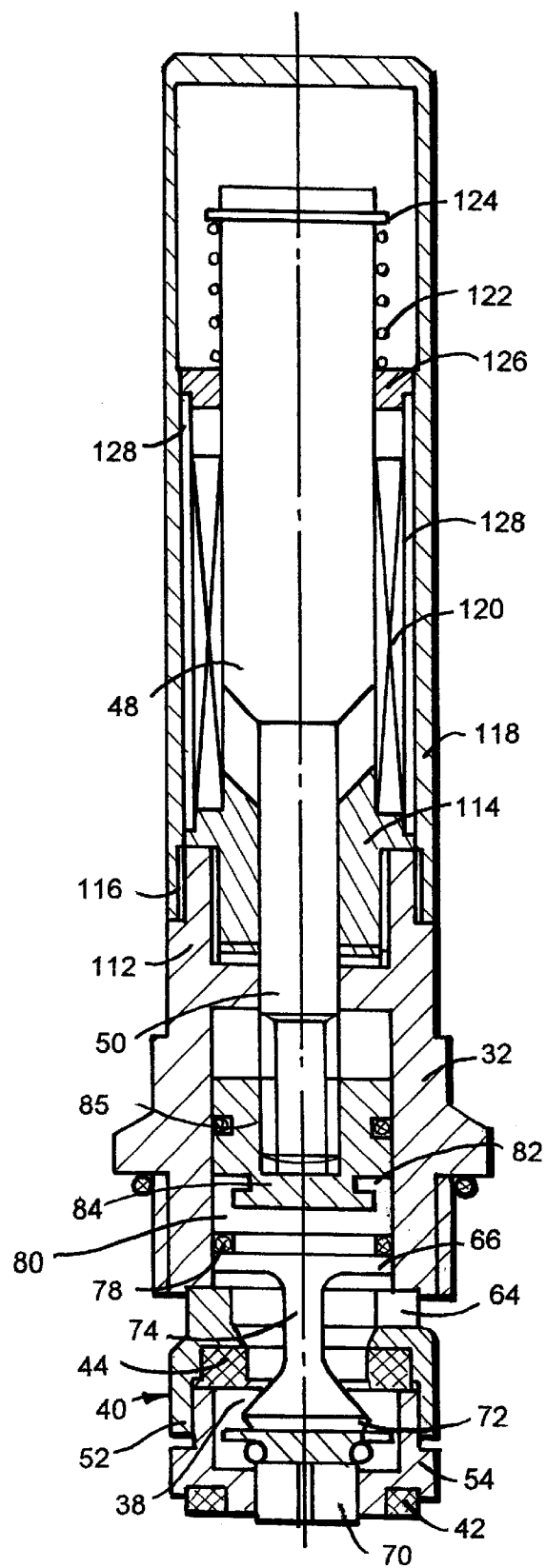
FIG. 3 is a longitudinal section view of a second embodiment of the valve cartridge; and, FIG. 4 is a schematic representation of a valve in which embodiments of the valve cartridge can be used.

Embodiments of the present valve cartridge 30 shown in FIGS. 1–3 were developed with a view to replacing the washer 20, spindle 22, and crown 28 of a conventional tap or valve 10. However, these and other embodiments may be used in different types of valves and in different applications (eg. in valves in white goods or in parts washing machines).

In the embodiment shown in FIGS. 1 and 2, the valve cartridge 30 comprises a housing 32 which is adapted for coupling to a tap 10 by virtue of a screw thread 34 provided about an outer circumferential surface of an upper length of the housing 32. An axially extending cavity 36 is formed centrally through the housing 32. Disposed, at least partially, within the cavity 36 is a piston 38 which, as explained in greater detail below, can be moved axially to open and close a valve 10 in which the cartridge 30 is installed. A flow chamber 40 is provided at the end of the housing 32 which carries the thread 34. The flow chamber 40 includes a first seal 42 for sealing against valve seat 18 of valve 10. Also retained within the flow chamber 40 is a piston seal 44 against which the piston 38 can abut to prevent the flow of fluid (eg. water) through the flow chamber. When the piston 38 is moved from the seal 44, water can flow through the chamber 40 and thus through the valve 10.

The piston 38 is moved axially by an actuator, without rotation, between a closed position in which it abuts the seal 44 and a fully open position in which it is spaced by a maximum predetermined distance from the seal 44.

In the embodiment shown in FIGS. 1 and 2, the actuator is in the form of a rotatable spindle 46. In the embodiment shown in FIG. 3, the actuator is in the form of a solenoid 48 with push rod 50. As will be explained in greater detail below, both the spindle 46 and solenoid/push rod 50 act to move the piston 38 axially without any rotation and to close the piston 38 onto the seal 44 with a predetermined pressure.

In order to utilise the cartridge 30, the housing 32 is threadingly coupled by thread 34 to the valve body 12. The first seal 42 seals against the valve seat 18. To control the flow of water through the tap 10 between the inlet 14 and outlet 16, the piston 38 is axially moved within the housing 32 and flow chamber 40 between the closed position in which it abuts the piston seal 44 and a fully open position in which it is spaced by some maximum distance from the seal 44 to provide maximum water flow.

The present embodiments will now be looked at in somewhat greater detail.

The flow chamber 40 is made from two main parts 52 and 54 which are press-fit together. Part 54 which is at the distant end of the cartridge 30 is substantially cylindrical in form with an increased diameter portion 56 (refer FIG. 2) at the upstream end. The increased diameter portion 56 is provided with an annular recess 58 for seating the seal 42. The first part 52 is also substantially cylindrical in form but is provided with a radially inwardly extending wall 60 at an end adjacent the housing 32. A hole 62 coaxial with cavity 36 and through which the piston 38 extends is formed in the wall 60. The piston seal 44 is seated on the interior surface of the wall 60. Stop means in the form of spaced apart lugs 64 are formed about the circumference of the first part 52 on the side of wall 60 opposite the piston seal 44. The lugs 64 extend radially inwardly into the cavity 36 so as to be able to abut base 66 of the piston 38.

The second part 54 press-fits into the first part 52 to the extent that it bears against the piston seal 44. When the first and second parts 52 and 54 are press-fit together, they define a cavity 68 in which is housed a non-return valve 70. The non-return valve 70 is arranged so as to prevent the flow of water in the direction from the outlet 16 to inlet 14. The components of the flow chamber 40 are dimensioned so that even when piston 38 is in the fully open position (ie. spaced from the seal 44 by a maximum displacement), it does not cause the non-return valve 70 to close the flow chamber 40.

Piston 38 comprises a disc-like head 72 which tapers to a stem 74 on the side which abuts the piston seal 44. The stem 74 is integrally formed with base 66. The base 66 is disc like and is formed with a circumferential groove 76 which receives an O-ring 78. An axially extending wall 80 is provided partially about the circumference of base 66 on a side opposite the stem 74. An inwardly extending lip 82 is formed along the circumferential end of wall 80.

Piston 38 is coupled to spindle 46 by coupling 84. The coupling 84 includes a knob 86 at one end which can be received by the lip 82 so as to couple the piston 38 to the coupling 84 in a manner which allows relative rotation therebetween. A circumferential groove 88 is formed about the exterior surface of the coupling 84 for receiving O-ring 90 (shown in FIG. 1). A blind threaded hole 85 is cut axially in the coupling 84 for engaging thread 87 of spindle 46. A number of spaced apart fingers 92 which extend in the axial direction are provided about the circumference of the coupling 84 at an end opposite the knob 86. A projection 94 is formed at the tip of each finger on a side facing the circumferential wall of the cavity 36.

Housing 32 is provided with an annular flange 96 adjacent the inboard end of thread 34. The flange 96 forms a seat for O-ring 98. When the cartridge 30 is screwed into valve 10, the flange 96 presses the O-ring 98 onto the body 12 to form a fluid seal. A rebate 100 is formed in the housing 32 at an opposite end of the thread 34 for receiving the lugs 64. The outer diameter of the rebate 100 is slightly smaller than the outer diameter of the lugs 64 so as to form a press-fit between the chamber 40 and housing 32.

The circumferential surface of cavity 36 at an end opposite the rebate 100 is provided with a plurality of spaced apart axially extending grooves 102. The grooves 102 together with fingers 92 and projections 94 form a detent means or system, or perhaps more accurately a ratchet mechanism, for resisting rotation of the coupling 84, and thus the piston 38, when the spindle 46 is turned clockwise or anticlockwise.

The spindle 46 is rotatably held and axially fixed within the housing 32 by a circlip or lock washer 104 which sits within a circumferential groove 106 formed about a part of the spindle 46 that lies outside of the body 32. The remaining length of the spindle 46 outside of the body 32 is formed in a conventional manner and includes a knurled boss 108 and threaded rectangular section post 110 for receiving a conventional handle such as handle 24 shown in FIG. 4

When the cartridge 30 is fully assembled as shown in FIG. 2, the thread 87 of spindle 46 engages the thread in blind hole 85 of the coupling 84, the knob 86 is received by the lip 82, the head 72 of the piston 38 is disposed within cavity 68 and the flow chamber 40 is press-fit onto the body 32. Housing 32 is coupled to the valve 10 by screw thread 34 and the first seal 42 seals against the valve seat 18. Assume that the piston 38 is in the closed position so that head 72 abuts against piston seal 44. In this configuration, the spindle 46 is screwed in the blind hole 85 of coupling 84 as far as possible. If one were to attempt to "further close" the valve 10 by turning spindle 64 in the clockwise direction, all that would happen is that the spindle 46 and coupling 84 will turn together within the housing 32 (the projections 94 ratcheting across grooves 102) with the piston 38 remaining stationary. The piston 38 remains stationary because the knob 86 simply turns inside the lip 82. Therefore, no matter how much one continues to rotate the spindle 46 in the clockwise direction, the axial and rotational (angular) position of the piston 38 remains unchanged. Therefore, it is not possible for the piston 38 to apply any further pressure on the seal 46, and there is no relative rotational movement between the piston head 72 and the seal 44.

To open the valve 10 the spindle 46 can now be rotated in an anticlockwise direction. Because the spindle 46 is axially fixed to the housing 32, this rotation forces the coupling 84 and thus piston 38 axially away from the spindle 46. This lifts the piston head 72 from the seal 44 allowing water to flow through the flow chamber 40, hole 62 and the spaces between the lugs 64. Rotation of the coupling 84 prior to the piston 34 being moved to its fully opened position is resisted by, the projections 94 being located within respective ones of the grooves 102. (If the coupling 84 were to rotate at this time with the spindle 46, the piston would not move axially and there be stuck in one position).

The spindle 46 is prevented from disengaging from the coupling 84 by abutment of the lugs 64 with the base 66 of the piston 38. This abutment also denotes the fully open position of the cartridge 30. Any further rotation of the spindle 46 in the clockwise direction results in the coupling 84 turning with the spindle 46 with the knob 86 turning inside the lip 82. At this point, the projections 94 are outside of the grooves 102 or alternately the fingers 92 can flex inwardly to ratchet grooves 102 thereby allowing the coupling 84 to turn.

In the second embodiment of the cartridge 130 shown in FIG. 3 like numbers are used to denote like features. The main difference between cartridge 30 shown in FIGS. 1 and 2 and cartridge 130 is that the spindle 46 is replaced by the solenoid 48 and push rod 50. Further, as the push rod 50 only moves in an axial direction, the detent means composed of the fingers 92, projections 94, and grooves 102 is not required in this embodiment. The push rod 50 is connected with the coupling 84 in a fixed manner so that there is no relative movement either axial or rotational therebetween.

The end of housing 32' opposite the flow chamber 40 is also of a slightly different configuration in order to allow connection to the solenoid 48. This end is provided with a threaded boss 112 for receiving a mounting thread 114 of the solenoid 48. A circumferential recess 116 is also formed about the free end of the boss 112 to receive solenoid housing 118. Enclosed within housing 118 is the solenoid coil 120 and solenoid return spring 122. The return spring 122 is bound between washer 124 located about an end of push rod 50 distant housing 32' and a base plate 126 spaced from the washer 124 toward the housing 32'. Base plate 126 is seated on shoulder 128 formed on the inner circumferential surface of the housing 118. Current carrying wires for energising the coils 120 pass through the housing 118, but are not shown in this figure.

When the solenoid 48 is energised the push rod 50 moves linearly toward flow chamber 40 lifting the piston 38 from the seal 44. This allows water to flow through the flow chamber 40 from inlet 14 to outlet 16. When the solenoid 48 is de-energised the return spring 120 forces the push rod 50 to move linearly away from flow chamber 40 thereby pressing the piston 38 and particular piston head 72 against the seal 44. This closes the flow chamber 40 preventing the flow of water from inlet 14 the outlet 16. The pressure applied by the piston to the seal 44 is fixed by the return spring 122.

As in cartridge 30, it is not possible in cartridge 130 to apply any further or otherwise excessive force or pressure to the seal 44. Additionally as the push rod 50 moves solely in the axial direction without any rotation, the piston 38 does not rotate. Even if for some reason while moving axially the push rod 50 were to rotate the coupling between the knob 86 and lip 82 would ensure that rotational motion is not imparted to the piston 38. Indeed, as the rotation of push rod 50 is in practice exceedingly unlikely and even if it did occur it would be negligible the coupling 84' could be completely dispensed with and the push rod 50 connected directly to the piston 38. However, for the purposes of interchangeability and simplified manufacture, it is preferred that coupling 84' be incorporated in cartridge 130.

It will be further noted that when the solenoid 48 is energised the spacing of the piston head 72 from valve seat 44 is controlled by abutment of base 66 with the lugs 64.

Now that embodiments of the valve cartridge have been described in detail it will be apparent to those skilled in the relevant arts that numerous modifications and variations may be made without departing from the basic inventive concepts. For example, in the cartridge 30 shown in FIGS. 1 and 2 the axial position of spindle 46 is fixed while the axial position of coupling 84 can vary in response to rotation of the spindle 46. However, this can be reversed with the axial position of the spindle 46 being variable and the actual position of the coupling 84 being fixed.

Also, the knob 86 and lip 82 arrangement for providing rotational coupling between the piston 38 and coupling 84 can be replaced with any mechanical equivalent which achieves the same effect. It will be recalled that the spindle 46 cannot be screwed entirely out of the coupling 84 because of the abutment between lugs 64 and base 66 of the piston 38. However, in an earlier working prototype maintaining a connection between the spindle 46 and coupling 84 was achieved by providing a circumferential flange about the spindle 46 adjacent thread 87 and forming diametrically opposed claws on the coupling 84 which can grip the flange. The claws were in the form of upstanding lugs which extend partially about the circumference of the coupling 84 and each provided with a lip on its inner surface which extends radially inwardly for sitting over the flange. The upstanding lugs are either made of flexible material or flexibly mounted on the coupling 84 so that they can be pushed apart by the flange when the spindle 46 is initially threaded into the coupling 84. With this arrangement, when the spindle is rotated a pre-determined number of revolutions in the anti-clockwise direction, moving the piston 38 to the fully opened position, the flange about the spindle 46 abuts the lips on the upstanding lugs. Because the lugs are housed within the cavity 36 they are prevented from flexing radially outwardly in response to further anti-clockwise rotation of the spindle 46. In this way the coupling 84 and spindle 46 are effectively locked together so that the coupling 84 now rotates with the spindle 46 in response to any further rotation in the anti-clockwise direction.

With cartridge 130 modifications can be made so as to allow the amount of separation between the piston head 72 and seal 44 to be varied. This provides a variable flow control of the solenoid operated valve cartridge 130. This can be achieved either mechanically or electrically.

Embodiments of this invention can of course be used in valves for controlling flow of gases and other fluids.

The component parts of the valve cartridges 30 and 130 can be made of plastics materials and/or metals or metal alloys such as brass.

All such modifications and variations are deemed to be within the scope of the present invention, the nature of which is to be determined from the foregoing description and the appended claims.

The claims defining the invention are as follows:

1. A valve cartridge for a valve having a fluid inlet, a fluid outlet, and a valve seat providing fluid communication between said fluid inlet and fluid outlet, said valve cartridge including:
    a housing adapted for coupling to said valve, said housing provided with an axially extending first cavity;
    a piston movable within said first cavity for controlling flow of fluid through said valve;
    a flow chamber provided at one end of said housing and through which said piston can travel, said flow chamber having a first seal for sealing against said valve seat and a piston seal downstream of said first seal against which said piston can seal to prevent flow of fluid through said flow chamber, said flow chamber further including stop means for stopping said piston from moving axially therebeyond the stop means including a plurality of spaced apart lugs formed about the circumference at one end of said flow chamber so as to abut said one end of said housing, said lugs extending radially into said first cavity so as to stop said piston from moving therebeyond, the spaces between adjacent lugs forming openings through which fluid can flow when in transit from said inlet to said outlet, said piston and flow chamber juxtaposed relative to said valve so that the pressure of the fluid acts in a direction tending to force said piston against said piston seal; and,
    an actuator for moving said piston axially without rotation between a closed position in which said piston abuts said piston seal with a predetermined pressure to prevent flow of fluid through said flow chamber, and a fully open position in which said piston is displaced from said piston seal and abuts said stop means to provide maximum fluid flow through said flow chamber;
    whereby, when said housing is coupled to said valve, said first seal abuts said valve seat and said actuator can be operated to move said piston axially through said cavity between said closed position and said fully open position to control the flow of fluid from said inlet to said outlet.

2. A valve cartridge according to claim 1 wherein, said flow chamber is formed separately from said housing and is frictionally coupled to said one end of said housing.

3. A valve cartridge according to claim 2 wherein, said one end of said housing is formed with a circumferential rebate for receiving said lugs.

4. A valve cartridge according to claim 3 wherein, the outer diameter of said circumferential rebate is smaller than the outer diameter of said lugs so that a press-fit is formed between said circumferential rebate and said lugs to hold said flow chamber to said housing.

5. A valve cartridge according to claim 1 wherein, said flow chamber comprises a first part which includes said lugs and said piston seal, and a second part which includes said first seal, said first and second parts being press-fit together.

6. A valve cartridge according to claim 5 wherein, said first and second parts define a second cavity therebetween in which a non-return valve is housed for preventing flow of fluid through said flow chamber in the direction from said outlet to said inlet.

7. A valve cartridge according to claim 6 wherein, said actuator comprises a solenoid which is coupled to said piston.

8. A valve cartridge according to claim 7 wherein, the linear position of said solenoid within said housing can be varied to vary the position of the piston when in the fully opened position to progressively vary the flow of fluid through said valve.

9. A valve cartridge according to claim 6 wherein, said actuator comprises a spindle rotatably supported by said housing and extending through said first cavity said spindle coupled to said piston in a manner so that rotation for a predetermined number of revolutions of said spindle in a first sense causes relative axial movement between said piston and said spindle in a first direction whereupon the relative axial position of said spindle and piston remains unchanged in response to further rotation of said spindle in said first sense, and rotation for a predetermined number of revolutions of said spindle in an opposite sense causes relative axial movement between said piston and said spindle in an opposite direction whereupon the relative axial position of said spindle and said piston remains unchanged in response to further rotation of said spindle in said opposite sense.

10. A valve cartridge according to claim 9, further including a coupling means for coupling said spindle to said piston with the piston coupled to said coupling means in a manner so as to allow relative rotation between said piston and said coupling means.

11. A valve cartridge according to claim 10, further including detent means or ratchet mechanism acting between said coupling means and said housing to resist rotation of said coupling means during said predetermined number of revolutions of said spindle.

12. A valve cartridge according to claim 11 wherein, said detent means or ratchet mechanism includes a plurality of axially extending grooves formed on a circumferential surface of said first cavity and at least one protrusion coupled to said coupling means for receipt in one of said grooves.

13. A valve cartridge according to claim 12 wherein, said coupling means is provided with at least one extending finger on each of which one of said projections is formed.

14. A valve cartridge according to claim 13 wherein, said coupling means further includes a circumferential groove for engaging a lip which is formed on and extends partially about the circumference of said piston, thereby facilitating said relative rotation between said piston and said coupling means.

15. A valve cartridge for a valve having a fluid inlet, a fluid outlet, and a valve seat providing fluid communication between said fluid inlet and fluid outlet, said valve cartridge including:

a housing adapted for coupling to said valve, said housing provided with an axially extending first cavity;

a piston movable within said first cavity for controlling flow of fluid through said valve;

a flow chamber provided at one end of said housing and through which said piston can travel, said flow chamber having a first seal for sealing against said valve seat and a piston seal downstream of said first seal against which said piston can seal to prevent flow of fluid through said flow chamber, said flow chamber further including stop means for stopping said piston from moving axially therebeyond the stop means including a plurality of spaced apart lugs formed about the circumference at one end of said flow chamber so as to abut said one end of said housing, said lugs extending radially into said first cavity so as to stop said piston from moving therebeyond, the spaces between adjacent lugs forming openings through which fluid can flow when in transit from said inlet to said outlet, said piston and flow chamber juxtaposed relative to said valve so that the pressure of the fluid acts in a direction tending to force said piston against said piston seal; and, a solenoid for moving said piston axially without rotation between a closed position in which said piston abuts said piston seal with a predetermined pressure to prevent flow of fluid through said flow chamber, and a fully open position in which said piston is displaced from said piston seal and abuts said stop means to provide maximum fluid flow through said flow chamber;

whereby, when said housing is coupled to said valve, said first seal abuts said valve seat and said actuator can be operated to move said piston axially through said cavity between said closed position and said fully open position to control the flow of fluid from said inlet to said outlet.

\* \* \* \* \*